United States Patent [19]

Nieten

[11] Patent Number: 5,944,783
[45] Date of Patent: Aug. 31, 1999

[54] APPARATUS AND METHOD FOR DATA TRANSFERS THROUGH SOFTWARE AGENTS USING CLIENT-TO-SERVER AND PEER-TO-PEER TRANSFERS

[75] Inventor: Joseph Lee Nieten, Pearland, Tex.

[73] Assignee: Lincom Corporation, Houston, Tex.

[21] Appl. No.: 08/902,142

[22] Filed: Jul. 29, 1997

[51] Int. Cl.⁶ ................................................. G06F 13/00
[52] U.S. Cl. .......................... 709/202; 709/203; 709/225
[58] Field of Search ........................ 395/200.32, 200.33, 395/200.55, 200.56, 200.54, 200.68; 709/202, 225, 226, 224, 238

[56] References Cited

U.S. PATENT DOCUMENTS

| | | | |
|---|---|---|---|
| 5,367,635 | 11/1994 | Bauer et al. | 395/200.32 |
| 5,655,081 | 8/1997 | Bonnell et al. | 395/200.32 |
| 5,761,428 | 6/1998 | Sidey | 395/200.32 |
| 5,768,506 | 6/1998 | Randell | 395/200.32 |
| 5,774,656 | 6/1998 | Hattori et al. | 395/200.55 |
| 5,774,660 | 6/1998 | Brendel et al. | 395/200.31 |
| 5,790,789 | 8/1998 | Suarez | 395/200.32 |
| 5,793,964 | 8/1998 | Rogers | 395/200.32 |

*Primary Examiner*—Zarni Maung
*Attorney, Agent, or Firm*—Wendy Buskop; Bayko Gibson et al

[57] ABSTRACT

An apparatus and method are provided for information transfer among software agents operating simultaneously on a digital network. A software agent is first created with an initial knowledge base and then placed into a community of agents setup on the network. Using an initial knowledge base, and utilizing built-in learning capabilities, the agent transfers information to other agents directly, or via a central community server. Information gathered by the agent can be either utilized by the agent to make decisions consistent with a pre-defined goal, or set of goals or the information may be presented to a user.

9 Claims, 5 Drawing Sheets

APPARATUS AND METHOD FOR DATA TRANSFERS THROUGH SOFTWARE AGENTS USING CLIENT-TO-SERVER AND PEER-TO-PEER TRANSFERS

BACKGROUND OF THE INVENTION

1. Field of the Invention

The present invention relates to a series of computer software programs that act as intelligent agents on a computer system, such as a digital computer network, for receiving instructions, obtaining information related to the instructions, and making decisions based upon the information obtained.

2. Description of the Related Art

1. Development Tools

Software programming has evolved significantly since its inception during World War II. At first, computers were programmed in a sequential series of instructions to perform a single task. This sequential type of programming was pervasive until the middle 1980's. Eventually, programs that performed multiple tasks based upon user input were created. The interface to control these tasks based execution upon events that were issued by the user. Software development tools quickly shifted to the new paradigm and ushered in event-driven software. Event driven software tends to be more "modular" than sequential programming. This modularity was later extended by the computer science discipline from "structured programming" to "object-oriented programming."

Object-oriented programming (OOP) lies at the heart of most modern programming languages. SmallTalk, C++, Delphi, and Java are OOP programming languages. For a general discussion of OOP technology, see Gary Entsminger, *The Tao of Objects: A Beginner's Guide to Object-Oriented Programming* (Second Edition), M&T Books, New York, N.Y., 1995; and David A. Taylor, *Object-Oriented Systems Design: An Integrated Approach,* Yourdon Press/PTR Prentice Hall, Englewood Cliffs, N.J., 1994.

There are specific terms of art in the field of object-oriented programming. One of ordinary skill in the art would be cognizant of the differences of the definitions presented herein and the definitions for the same term as used at some future date. The primary terms of art for OOP are: Class, Object, Instantiation, Instance Variable, Member Function (Method), Property, Subclassing, Ancestor Class, Parent Class, and Descendent Class.

A class or class definition is the fundamental structure in the OOP discipline. The class determines what the defined data element and code routines will be for all objects created from that class. The class also defines the scope of those elements, determining which code routines will be for external methods, and which data variables will be properties. The class is not an object itself. It merely defines how to build an object, and what that object's capabilities will be once it is created.

An object is an actual entity that is created at runtime and resides in active program memory. An object is created from a class definition. The class definition determines what methods and properties the object has. The class definition can also define the initial values for the object's properties. Once an object is created, it no longer refers back to the class from which it was created. Thus, any runtime changes made to an object have no effect whatsoever on any other object created from the same class.

Instantiation is the name given to the process of creating an in-memory object from a class definition. This process creates an instance of the class—hence the name. An instance of a class is also referred to as an object of the class' type.

A data element associated with an object is known as an instance variable. Although all objects within a particular class will have variables defined with the same names, each object will have separate memory storage for each of these variables. Thus, each instance of the class has its own copy of each instance variable.

A member function (called a method in Delphi) are publicly available procedures and functions of a class. The word public signifies that one object can invoke another object's member function. An object can contain private member functions and variables for internal use that are hidden from other objects.

A property is a special kind of instance variable. Typically, a property is paired with a private (or protected) instance variable upon which the class' code routines actually operate. The property is used to control how data is retrieved from or written to the private instance variable.

The process of creating a child class definition through inheritance from a parent class is called subclassing. Subclassing only has meaning in the context of the data elements and code routines inherited from the parent class. The child class thus created will have additional properties and member functions defined, or will redefine one or more of the parent's member functions (via polymorphism), or both.

An ancestor class is a class from which data and code definitions are inherited. This ancestor class may not be the immediate parent from which a child class was defined. The parent class may be higher up the inheritance hierarchy.

A parent class is the immediate ancestor class from which data and code definitions are inherited to create a new child class definition.

Any class that has been defined based upon inheritance from another class is known as a descendant class of that ancestor. The terms child class and descendant class are usually used interchangeably. A more strict definition of descendant class would be any class that inherits from an ancestor that may or may not be the immediate child of that ancestor. Parent and child classes describe immediate inheritance relationships, whereas ancestor and descendant classes are their more general corollaries.

There are three fundamental concepts that are the foundation of object-oriented programming: Encapsulation, Inheritance, and Polymorphism. The idea behind encapsulation is that data structures and code routines that manipulate the data structures are bound together (encapsulated), into a single entity called an object. An object-oriented software programs can contain one or more objects. One object, as well as the program's main code can access pre-selected data (called properties) within an object, or issue commands to objects in order to perform some procedure or function (called member functions). All access to the object's internal data structures and code routines must go through the object's interface. This structure allows one object to "hide" some or all of its data from another object in order to keep the code or data from being publicly available. This ability of an object to hide its data, and even its code, is a crucial feature of encapsulation. Most programming errors (bugs) arise from the need for code re-entrance (the need to execute the same code from within multiple application contexts) and data access concurrence (the need to be able to have multiple pieces of code use the same data variables at the same time). Encapsulation, by its very nature, eliminates these types of programming errors.

The second fundamental object-oriented concept is inheritance. Just like biological inheritance, OOP inheritance allows a programmer to create child object definitions, called child classes, that inherit the methods and data structures of the parent class. One benefit of inheritance is that you can create a child class and then use the inherited methods and properties from the parent class without having to recreate them from scratch. You then code only the differences between the parent and child classes. This process is known as programming by exception. This enables the programmer to concentrate on creating those methods and properties that are unique to the child class. An additional benefit of inheritance is that it affords easier maintainability. Inheritance provides a mechanism that permits programmers to make a change in the parent class knowing that the effect will ripple throughout all of the child classes automatically. Inheritance gives programmers a choice when confronted with a programming task. They can either create a custom object, or inherit from an existing (thoroughly debugged) object and then program the differences. The latter technique is know as subclassing.

The last fundamental concept of object-oriented programming is polymorphism. All programming languages allow the programmer to create a set of publicly available functions (known as external methods) for each object. These external methods make up the objects "application program interface" (API). Polymorphism adds the ability to use the same method name to perform vastly different operations, based upon the type of object that is being referenced by the method. Because of polymorphism, a programmer can simply tell an object to perform a particular method without being concerned with any internal differences from one type of object to the next. The object is left with the details to work out on its own. One last aspect of polymorphism is a concept called method overloading wherein a method with a single name will perform similar functions for two different objects. For example, two child classes, called "Dog" and "Kangaroo" can be created as descendants from the "Animal" class. One of the characteristics of all animals is that they run from a threat. This characteristic is promulgated in the member function "Run." The Dog object and the Kangaroo object, as descendants from the Animal class, both have a member function called Run. However, dog's don't run the way kangaroos "run." Consequently, a programmer making a Kangaroo object will modify the Animal class' Run member function accordingly. This is a great benefit to other software developers. If a developer is using a Dog object, he merely invokes the "Run" member function (written as Dog.Run) in order to make the evade a threat. Similarly, the (modified) "Run" method for the Kangaroo object (written as Kangaroo.Run) would cause the kangaroo to hop on its hind legs in order to evade the threat. The programmer would not need to know that kangaroos "hop" instead of "run." Those details are left to the developer of the Kangaroo class. With method overloading, the developer would only need to know that, to make anything descended from the Animal class evade a threat, he merely needs to call its Run member function.

2. The Internet

The Internet, known metaphorically as the "information superhighway," is a world-wide computer network. The Internet performs a wide variety of services and can act as a transport medium for an even wider variety of digital information in the form of electrical signals. The flexibility of the Internet to act as a transport medium for digital information has fueled the unique explosion of innovation and growth that is associated with the Internet. The source of that flexibility is the client/server model. This model divides application programs into two parts: the client program, with which the user interacts, and the server program, which coordinates activities with multiple clients. In the most simple case, these two programs can run on the same computer. More commonly, clients and servers are separate hosts that are connected via a local area network (LAN) or the Internet. A Personal Computer (PC) is commonly used as a client host. Mainframe computers or specially designed file/database servers commonly act as serving hosts. Using this methodology, the software application can run and be effective regardless of the hardware's physical location.

One of the fundamental issues regarding a network that implements a client/server method is addressing. If the server cannot be located, the data cannot be retrieved. Fortunately, all networks can handle the addressing issue by using a protocol common throughout the network. In the case of the Internet, the protocol is the Internet Protocol (IP). Every host connected to the Internet has a unique 32-bit identifier called an IP address. The IP address is divided into four eight-bit values, or octets. A binary representation of the bits comprising an octet are, for example, 01001010, which is equivalent to decimal 73. Each octet is subdivided into high order bits and low order bits. In the previous example, the high order bits would be the four leftmost (or 0100). The low order bits in the previous example would be the four rightmost (or 1010). The value of the IP address is usually written in dotted decimal notation of each octet, such as "73.999.123.1," with the first octet taking the leftmost position. For example, the network address 128.1.2.3 translates to 10000000.00000001.00000010.00000011 in binary.

The high-order bits of the first octet have special significance: They divide the IP address into five classes: A, B, C, D, and E. Depending upon the class of address, a certain number of bits are used to identify networks, and the remainder are used to identify specific hosts. For example, in a Class A address, the first high order bit of the first octet is always 0. The next seven bits in a Class A address identify the network, and the last 24 bits identify the host on the network. Consequently, Class A addresses are used primarily by very large organizations.

If the first two bits are 10, then it is a Class B address. The first two bits indicate the class, the next 14 bits constitute the network address, and the last 16 bits signify the specific host. Class B addresses are among the most common Internet addresses. Class B addresses are used by corporations, universities, and Internet Service Providers (ISP).

When a user is first connected to the Internet, the ISP usually assigns an unused IP address (for a host) to the user. If the user connects to a local area network (LAN) that is attached to the Internet, the network administrator might assign addresses manually, or use the Dynamic Host Configuration Protocol (DHCP) to assign addresses automatically, from a block of addresses reserved by the ISP. IP addresses solve only the problem of uniquely identifying a host and its network. The low-level Internet protocol relies on the IP address to transport information between hosts on the network.

In short, the Internet protocol is the foundation of the Internet. IP defines the datagram that is the fundamental transmission unit of the Internet. IP specifies the addressing scheme and handles the routing of the datagrams within the Internet. Finally, IP provides the best effort delivery of data, the fragmentation (breaking data streams into smaller pieces), and reassembly of the fragmented data on the receiving end. However, IP does not deal with the specific format of the data that constitutes the communications between hosts on the network. That duty is handled by other protocols that are addressed below.

Once IP addresses are known, communications can commence between hosts on the network. Communications between client/server applications are, by necessity, founded on common specifications agreed upon in advance. These specifications are known as protocols. Most Internet protocol specifications are recorded in RFC (Request for Comment) documents. If Internet users think that an RFC has sufficient merit, it will be widely implemented. An example is RFC 959, more commonly known as the File Transfer Protocol (FTP). Almost any data communications network transmits data in small chunks, usually referred to as packets or datagrams. A datagram is simply a specific number of bytes that are grouped together and sent at one time. Networks break continuous data streams into smaller datagrams in order to share resources, handle errors, and isolate failures. How datagrams are sent and received depends upon the protocol used. The Internet, like any network, is based upon protocol layers, commonly assembled into a protocol stack. The Open System Interconnect (OSI) Reference Model is an architectural model that provides a common reference for discussing communication layers and stacks.

Internet working requires different services from various hardware and software components. One layer can gather related functions, thereby reducing a large number of responsibilities to a smaller number of layers. A layer might be implemented in hardware (such as a modem) or in software (such as an operating system). Arguably, the most widely used protocol stack on the Internet is the Transmission Control Protocol/Internet Protocol (TCP/IP). TCP/IP provides a specific stack of layers that enable software applications to access standard Internet services.

TCP/IP's architecture consists of four layers. The lowest layer is the network access layer that specifies the physical link and delivers data across the specified link. Next is the Internet layer that defines datagrams and routes data through the network. The third layer is the transport layer that provides error detection and correction throughout the network path. Finally, the topmost layer is the application layer that consists of application programs that use the network. Networks build datagrams by passing the data (from the application layer) down through the other layers, each of which encapsulates the data and adds its own header. The header contains control information to ensure proper delivery of the datagram. This procedure is reversed at the receiving end, as each layer strips is respective header before passing data to the layer above.

Each layer has its own data structures and is unaware of the data structures used in the layers above or below it. TCP does not directly interact with IP, and IP does not directly manipulate the low-level structures of the transport medium (such as Ethernet). The data transferred from application to application does not have any headers and is thus seen as a continuous stream of information. The open design of the protocol specification gives Internet applications independence from the method used to carry data, and thus enables a wide variety of clients to access a standard server. Additional protocols are used to format the data that constitutes the communication between applications.

Software programs that use a common specification (protocol) for communication can interoperate. Even though the programs are from different software developers, they can all exchange messages with each other so long as the data obeys the agreed-upon protocol. Client programs using different computers and operating systems can also connect to the same server, so long as both the client and server programs use the same protocol. Other important communications protocols are used within the gambit of TCP/IP. The major Internet communication protocols include: Simple Mail Transfer Protocol (SMTP) and Post Office Protocol (POP) for electronic mail;

Network News Transport Protocol (NNTP) for Usenet Newsgroups; and the Hypertext Transfer Protocol (HTTP) for the World Wide Web.

3. Sockets

IP addressing identifies hosts on the Internet. TCP/IP conversations support data communications across the Internet. One of the best features of this architecture is the sharing of resources so that many messages may be transmitted simultaneously across the Internet. However, in some instances, data from several sources, such as a web page and electronic mail, may reach the same host at the same time. Something must be done to sort or direct various data that arrive at the host simultaneously. TCP/IP solves this problem by using protocol numbers and port numbers to combine data from multiple processes, ship it over the Internet, and then split the incoming data apart at the client. Well-known ports provide the consistency needed for a client program to access the appropriate program on the server. Because the sender and receiver agree in advance which services are offered on which ports, software developers can use well-known ports to facilitate the connection process. Given the unique combination of an IP address and a TCP port number, a client application can establish communication with the exact server process required.

The unique combination of an IP address and a TCP port number is called a socket. For example, port 37 on host 192.5.41.41 is a socket that uniquely defines the TIME service on the U.S. Directorate of Time's time server. 192.5.41.41 is the TCP/IP address of the United States Directorate of Time's server computer, and port 37 is the service port of the TIME service or function. All systems that offer the TIME service offer it on port 37.

In addition to well-known and reserved ports, there are dynamically allocated ports. As their name implies, these ports are assigned on demand. The TCP/IP software tracks the ports that are in use in order to ensure that two processes do not have the same port number. Client applications that are connecting to a server application (usually on another computer) often use dynamically allocated ports. The client application does not need to use a specific port because the client applications are not trying to find it and connect to it. Dynamically allocated ports enable client computer systems to connect to multiple servers simultaneously. The client merely needs to allocate a specific port for communications with the specific server.

A socket uniquely identifies a single network process within the entire Internet. However, a socket based on a well-known port handles only half of the conversation: the client to the server. For meaningful conversation to occur, the server must be capable of returning data to the client. This is accomplished by exchanging port numbers.

For example, a client application may randomly generate a source port, such as 3049. The client would then send a segment with that source port and a destination port, such as 80 (the well-known HTTP port). TCP/IP then splits the segment across multiple datagrams and sends them across the Internet. Next, the receiving host reassembles the datagrams into a segment and passes it to the web server. In response, the web server builds a TCP segment, using 80 as the segment's source port and 3049 as its destination port.

The sever then splits the segment into datagrams and sends them to the client.

4. Robots and Java

Although the World Wide Web (the "Web") is arguably the most powerful service on the Internet, most of its power comes from the data transported through the Web, not from the Hypertext Transfer Protocol that supports it. The Web supports the client/server method very well, with "web servers" retaining documents for access by client programs such as a web browser that ask the web server to transmit a copy of the requested document. A web browser is an example of a server-to-client program in that the server retains the data which is copied to the client upon request.

Prior art web browsers are almost exclusively manipulated by a user, who requests documents one-at-a-time. This searching/document request method has been automated in the form of a web robot. Most Internet robots automate the task of verifying Uniform Resource Locator (URL) links (that link one web page to another). Other web robots, often called web crawlers, are used for finding related documents among many web servers. Unlike a web browser, a web robot can be programmed to find web servers and the documents they contain automatically.

Recently, the utility of the web server has been extended by the delivery of application programs as well as document-styled data. The current state-of-the-art on the Web uses technologies like Java to deliver actual programs from the web server to the client web browser. The client then runs the Java program (called an applet), thereby achieving a higher level of interaction with the user.

Java is a general-purpose, multi-threaded, object-oriented language, that is portable across a wide variety of operating systems and processor architectures. Java was initially developed to address the problems of building software for small distributed systems to embed in consumer devices. As such, it was designed for heterogenous networks, multiple host architectures, and secure delivery. To meet these requirements, Java code had to survive transport across a network, operate on any client, and assure the client that it was safe to run. The popularization of the World Wide Web helped to popularize Java's attributes.

Web documents are typically written in a special format for web browsers using the Hypertext Markup Language (HTML). HTML allows web documents to contain embedded URL's within the web page to establish links to other web pages. While HTML is useful for creating web pages, the format is considered too limited. The solution to the that problem was extend the capability of web pages written in HTML with Java programs.

Java programs are compiled into applets that can be embedded into web pages. The web pages are then viewed with a Java-enabled browser, such as HotJava, made by Sun Microsystems, Inc. The applets are transparently downloaded into the HotJava browser along with the HTML pages in which they appear. Java programs are compiled into a standard code. The Java code is then run on the Java-enabled browser on the client machine. Only the Java-enabled browser is made specifically for a particular operating system/microprocessor combination. To a large extent, Java is just another data type, like a web document. Any web server can serve Java applets, which the server handles the same as any other file. The special action happens when a Java-enabled web browser on the client machine interprets the applet class files and executes the applet.

Java is designed to support a distributed environment. It has a library of routines, called API (application program interfaces). One such API is called JAVA.NET, and is used for accessing such TCP/IP protocols as HTTP and FTP. Because Java integrates well with Web services, programmers can access objects across the Internet through Uniform Resource Locators (URL's) as easily as most languages enable programmers to access the local file system.

Java API's includes several class and member function libraries that developers can use to create multi-platform applications. These libraries include the following: JAVA.LANG (which includes the base types that are essential to any program); JAVA.IO (which supports file input/output and data streams); JAVA.NET (which provides for sockets, URL's and other interfaces); JAVA.UTIL (which supplies container and utility classes); and JAVA.AWT (which is a toolkit for making Java applications portable from one computer system to another (dissimilar) system).

Java is an extensible language, in that new types of objects can be created in Java. These custom objects can be constructed by software developers to do things that other, standard objects cannot. As with other OOP languages, member functions of Java objects can be inherited and modified to suit particular needs.

Although Java programs are useful, they are limited because they come from the server to the client. It would be useful to develop client-to-server programs that make more use of the client's capabilities which, in some cases, can rival that of the server. Unfortunately, the state-of-the-art does not support client-to-server programs or client-to-client programs that utilize information provided a server. There is, therefore, a need in the art for a client-to-server program and a client-to-client program. There is also a need in the art for client-to-server programs and client-to-client programs that run autonomously so that single-purpose programs can combine their functionality with other single-purpose programs and perform complex tasks. It is an object of the present invention to overcome the limitations of the prior art.

SUMMARY OF THE INVENTION

The present invention solves the problems inherent in the prior art. An apparatus and method are provided for information transfer among software agents operating simultaneously on a digital network. A software agent is first created with an initial knowledge base and then placed into a community of agents setup on the network. Using an initial knowledge base, and utilizing built-in learning capabilities, the agent transfers information to other agents directly, or via a central community server. Information gathered by the agent can be either utilized by the agent to make decisions consistent with a pre-defined goal, or set of goals or the information may be presented to a user.

Figure 3:
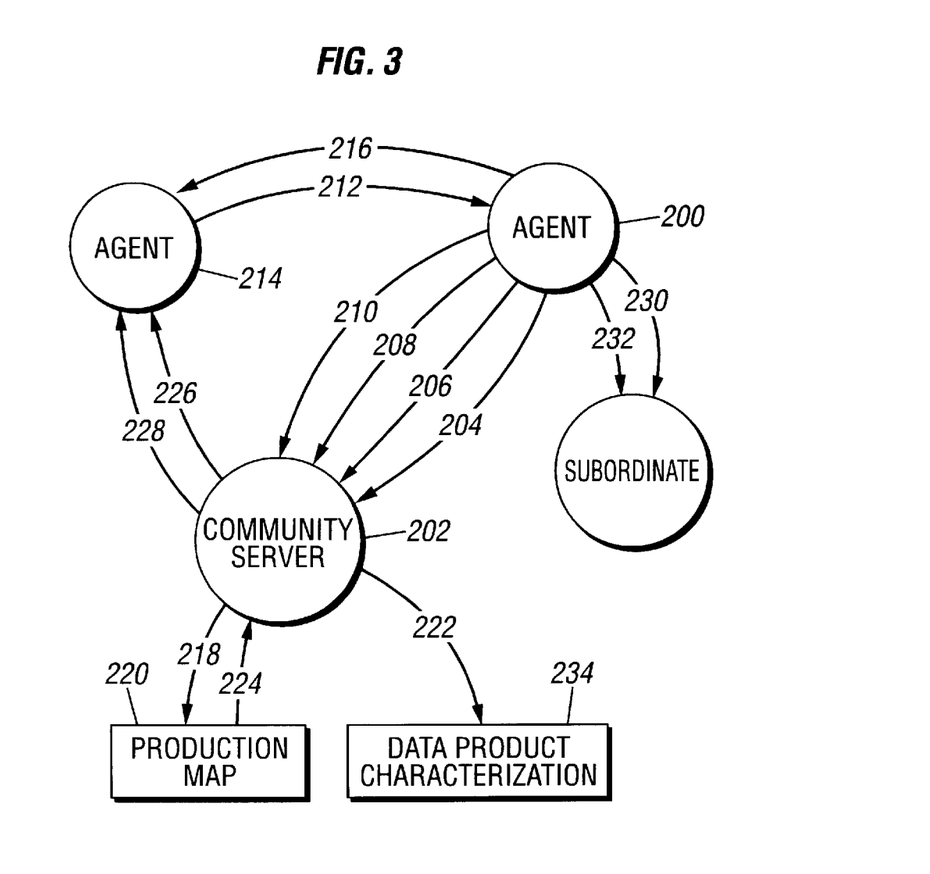
FIG. 3 shows the theoretical steps of the present invention.
Figure 4:
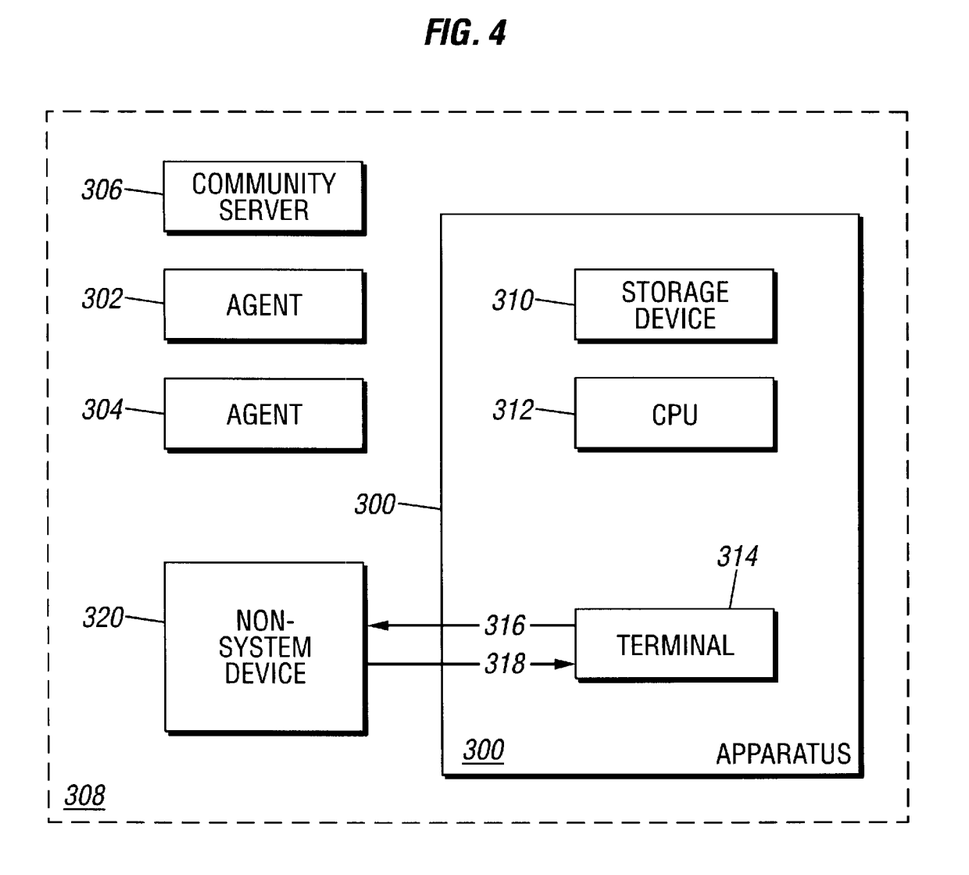
FIG. 4 and FIG. 5 show the structures of the apparatus of the present invention.
Figure 5:
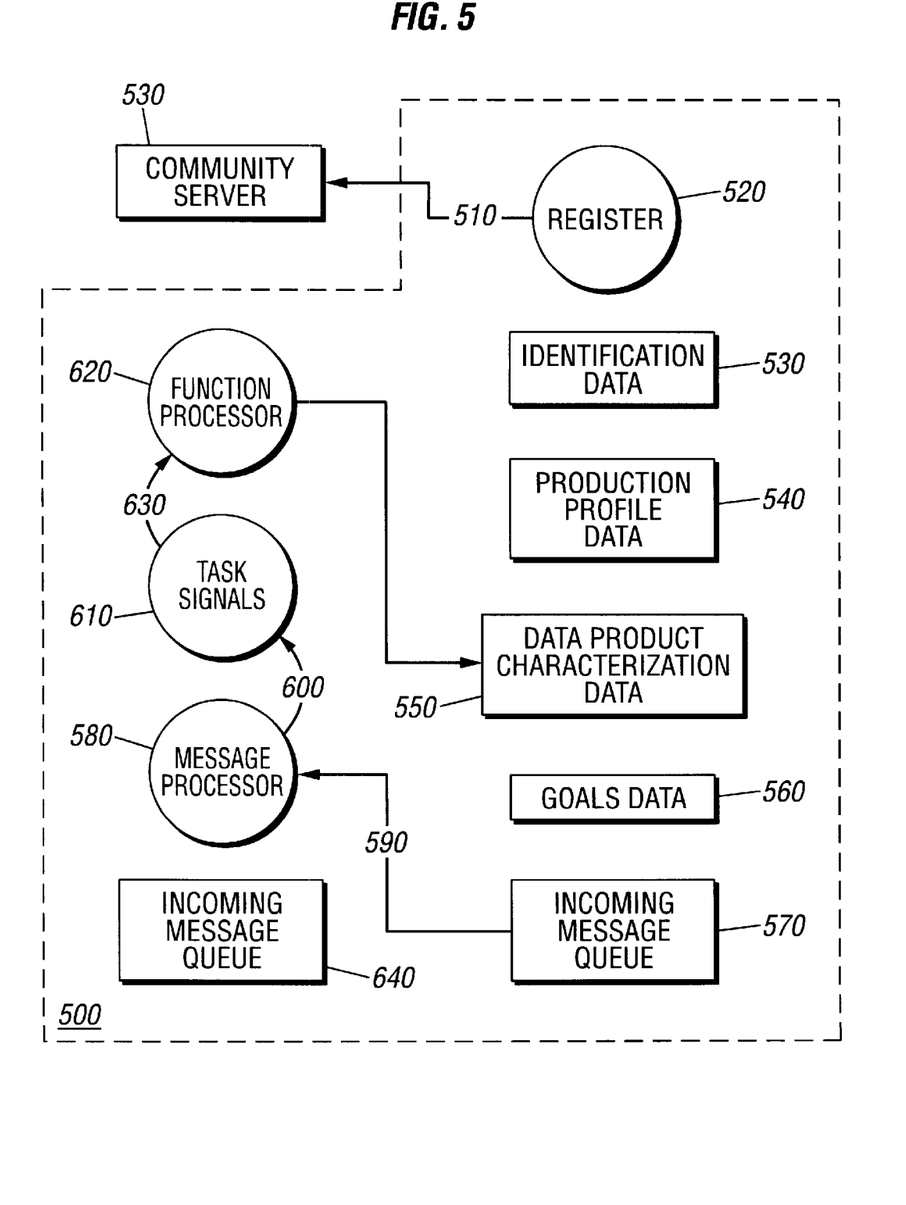
Figure 6:
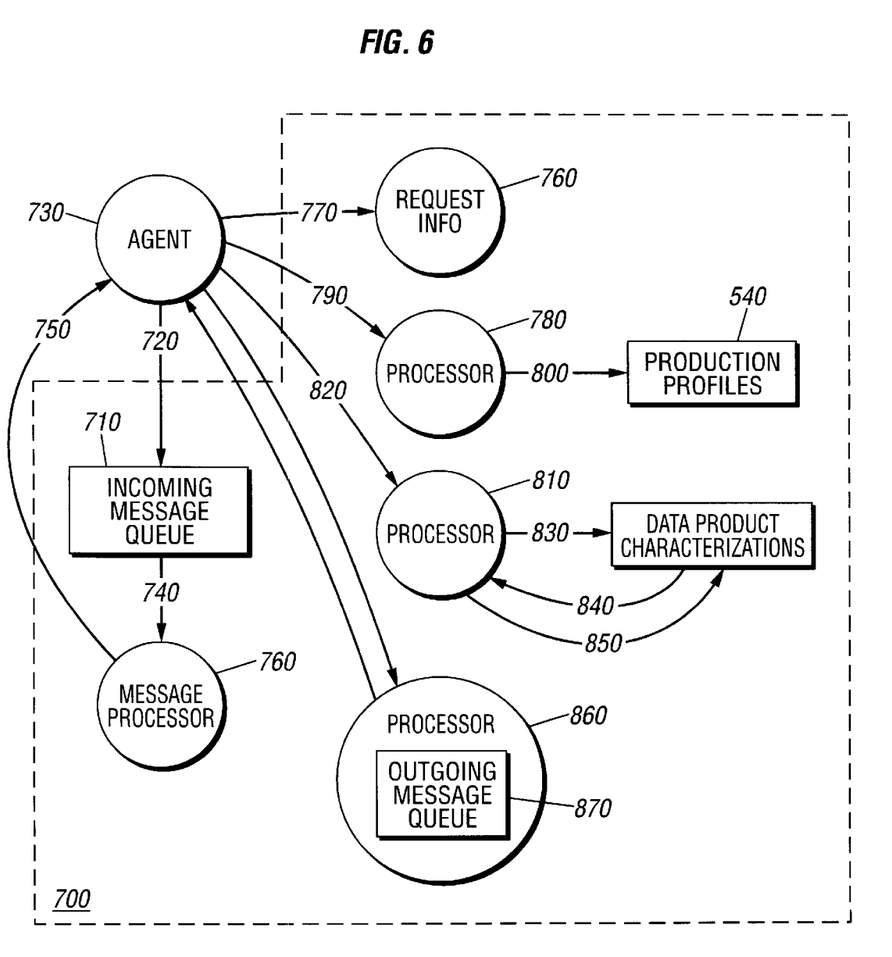
FIG. 6 shows the sequence of steps of the theoretical model of the present invention.

The present invention more specifically involves a method for transferring electrical signals between at least two agents and a community server in an electronic community on a computer system using at least one agent capable of communicating with at least one other agent and a community server with each agent having a production profile and a defined set of goals. As shown in FIG. 3 Each agent 200 is registering with the community server 200 by transmitting a production profile 204 to the community server, and transmitting a data production characterization 206 to the community server. Further, each agent can execute on the set of goals of the agent by making announcements to the community server of data products 208 produced by the agent making requests to the community server for data products needed by the agent 210, receiving requests for data products 212 from at least one other agent 214, and transmitting data products 216 based on requests for data products to at least one other agent 214.

The community server is capable of several functions including receiving production profile 204 from each agent, creating 218 a production map 220 made up of the production profiles of each agent, receiving data product characterizations 206 from each agent, and storing 272 data product characterizations 234. The community server can also process announcements regarding data products from at least one agent by receiving announcements for data products 208 from an agent, identifying agents in the production map 224 which have production profiles containing a consumption specification for the data products in the announcement, and transmitting announcements for data products 210 to identified agents having the production profiles containing the consumption specification for the data products in the announcements.

The community server can also process requests for data products from at least one agent by receiving requests for data products 210 from an agent, identifying agents in the production 224 map which have production profiles containing a production specification for the data products in the requests, and transmitting requests for data products to identified agents having the production profiles containing the production specification for the data products in the requests.

Each agent is capable of performing the following additional task, to a subordinate agent by the following steps: creating a subordinate agent 230 to handle a portion of the set of goals of said agent creating the subordinate agent, wherein the subordinate agent has an identical production profile to the agent creating said subordinate agent and a portion of the set of goals of the agent creating the subordinate agent, and initiating the execution 232 of the subordinate agent's set of goals.

Apparatus for transferring electrical signals between at least two agents and a community server in an electronic community on a computer system comprising of: a storage device, a central processing unit capable of running multiple programs simultaneously; a network connection terminal capable of sending and receiving electrical signals from at least one non-system device to said terminal. At least two agent instances, each agent comprising an ability to register with a community server using a socket address defining the location of the agent instance on the computer system, identification data used to recognize the agent instance, production profile data, and data product characterization data. Data defining a set of goals, said set of goals being used to define the purpose of the agent instances, an incoming message queue, capable of receiving messages on said computer system for said agent instance. A message processor capable of interpreting messages received by said incoming message queue and generating task signals in response to said incoming messages from other agents. A function processor capable of producing data product on said computer system in response to a task signal from said message processor and transmitting said data product to another agent. An outgoing message queue for processing data product announcements and data product requests to the community server and other agents. A community server instance comprising of an incoming message queue capable of receiving information from agents, including but not limited to production profiles of each agent. Data product characterizations from each agent, a message processor capable of interpreting messages received by said incoming message queue and generating task signals in response to said incoming messages from agents, an ability to request information from agents, including but not limited to production profiles of each agent and data product characterizations of each agent, a processor for receiving and compiling production profiles of agents into a production map, a processor receiving, storing, comparing, and updating data product characterizations received from agents, a processor with outgoing message queue for receiving and responding to data product announcements and data product requests from agents.

DETAILED DESCRIPTION OF THE INVENTION

Some tasks undertaken by humans can be quite complex. However, the majority of tasks performed by humans are made up of a number of simpler tasks. The human mind is quite adept at combining the sequence and operation of these simpler tasks to solve more complex problems. Most software programs are created to perform a limited number of relatively simple tasks as directed by a human user. Until the advent of the present invention, however, there has been no group of software programs that talk to one another so that single tasks can be arranged autonomously at run-time and performed systematically in order to accomplish more complex tasks. The present invention provides a mechanism and a paradigm by which single-purpose software programs can communicate with each other to achieve a common goal that is beyond the capability of any single software program.

The following definitions will be used in the present invention.

"Incoming Message Queue" shall be defined as a software object that receives messages and stores them until they are required by some other entity.

"Message Processor" shall be defined as a software program that monitors a Message Queue for activity, processing messages as they appear.

"Function Processor" shall be defined as a software program that responds to task signals by executing the appropriate software program.

"Outgoing Message Queue" shall mean a software program that works within its own thread to send a message to some entity within the electronic community.

"Processor" shall refer to a software program.

"Processor for resolving conflicts between data product characterizations" shall mean complex software program employing expert system technologies to resolve semantic differences in DP characterizations.

"Set of Goals" shall mean those behaviors an agent is expected to perform. These goals identify WHEN Data Products are produced and consumed by this agent.

"Data Product" refers to information packaged as an object.

"Message" shall mean information packaged in a form to enable transmission of the information from one computer system to another.

"Request" shall be defined as a specific type of message indicating an agent needs a particular data product.

"Data Product Characterization" shall mean a description of the Data Product expressed in a form that is understandable by all entities within an electronic community. The data product characterizations can be alpha numeric characterizations. Meta data representations can be used. Neural representations can be used.

"Production Map" shall refer to lists of Data Products produced and consumed by the member agents of an electronic community, and the producers and consumers for each of these data products.

"Consumption Specification" refers to a machine interpretable specification identifying the Data Products consumed, and any Data Product that might be produced as a consequence.

"Production Specification" refers to a machine interpretable specification identifying the Data Products produced, and any Data Products that must be consumed in order to make the production possible (if any).

"Creating a Subordinate Agent" means the act of creating an instance of the subordinate agent.

"Initiating the Execution" means the act of running the "start" method for the subordinate agent instance.

"Electrical Signal" refers to messages transmitted electronically between at least one agent on a computer system to at least one other agent and/or the community server.

"Electric Community" means the abstract collection of two or more agents and a community server.

"Agent" refers to a software program that executes autonomously using a set of goals to guide their execution and having a product profile and data product characterizations.

"Principal Agent" refers to an agent that is designed to be a fundamental part of an electronic community.

"Subordinate Agent" is an agent created by a principal agent to help distribute the principal agent's work load.

"Community Server" refers to a software program that maintains information about an electronic community i.e., production information about all agents.

"Processor" refers to the software program that identifies when principal agents are overloaded, and what other resources are available to help execute some of the principal agent's tasks.

"Computer System" refers to stand alone computer or a network of computers.

"Address Data" refers to the IP address and port number.

"Identification Data" refers to the name of agent instance and access code of agent.

"Production Profile" shall mean the lists of needed Data Products and list produced Data Products by the agent (consumption specification).

The central feature of the present invention is the agent. An agent in this instance is defined as a software program that performs a function for a user or another software program in an autonomous manner. There can be an infinite variety of the types of agents (i.e., agents that perform different tasks), as well as a nearly infinite number of agents. The present invention employs at least one, but preferably a group of agents, each of which can be programmed to perform a single task or a limited number of tasks based on a set of goals.

In the preferred embodiment of the present invention, an agent is created within the electronic community and is provided a set of goals, a production profile and a data product characterization. Consequently, the agent must be able to interpret its goals and have some capability of accomplishing those goals. In addition, the agent also requires information about the electronic community in order to navigate within the electronic community. Agents that possess these capabilities are commonly referred to as intelligent agents. The best mode of the present invention involves a group of two or more intelligent agents. Each agent must have the capability to:

1. Know who it is. An agent must know its own identity, its name.
2. Know what it is. An agent must know what type of agent it is. Different types of agents will "speak" different "languages" and an agent must know what language it speaks so that it can help other agents communicate with it;
3. Know where it is. An agent must know where it is, its sprocket, so that it can tell other agents where messages can be received;
4. Know why it exists. An agent must have a purpose. This purpose can be an initial set of goals to accomplish given the knowledge of the electronic community at the time the goal is provided; and
5. Work autonomously. Agents should be as autonomous as possible in order to permit them to accomplish their goals with minimal interaction with the user or the outside world.

The level of interaction between a user and an agent can very depending upon the complexity of the task the user expects the agents to perform.

Figure 1:
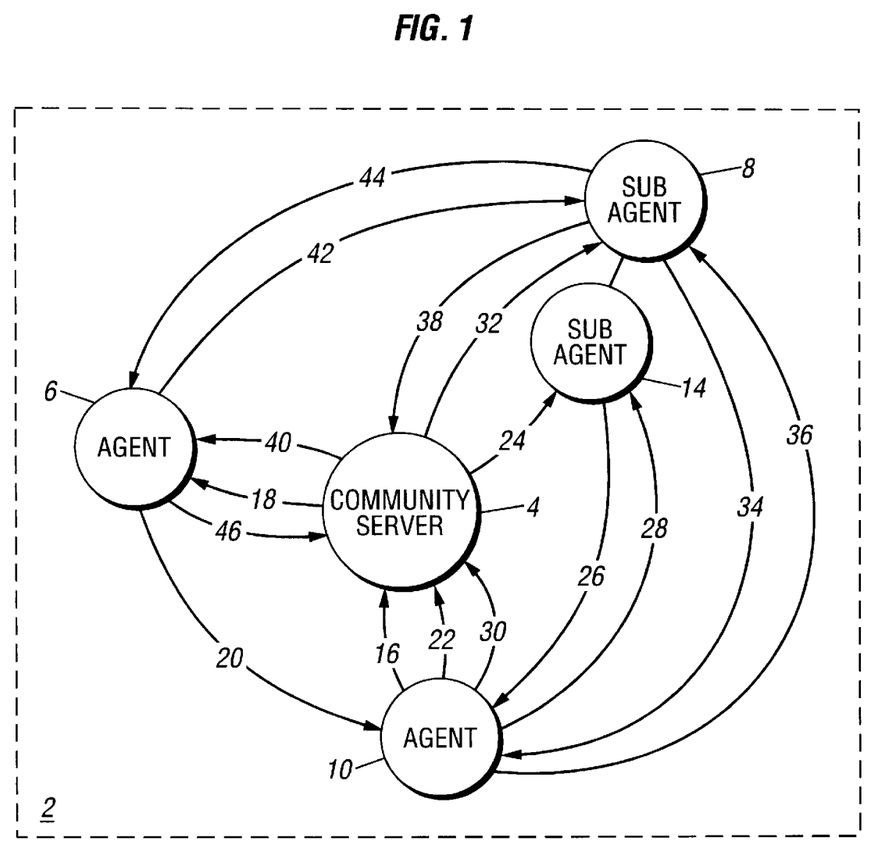
FIG. 1 shows the theoretical model of the present invention.

The preferred embodiment of the present invention as shown in FIG. 1. In FIG. 1, an electronic community (2) contains a community server (4), and principal agents (6) (8) and (10). Principal agent (8) has a subordinate agent (14). To explain this electronic community (2) a scenario might exist like the following. Agent (6) has a behavior that comprises a Production Profile to produce A and produce B given C. It has a set of goals which is produce A on demand and produce B upon receipt of C. Another agent (8) has a behavior with a production profile produce C given D and consume E. Its goals are produce C upon receipt of D.

Agent 14 which is an ordinate agent of subordinate Agent 8 has the set of goals to consume E when available.

Agent 10 has a behavior which includes the production profile Produce D given E and Produce E given A. Its goals are Produce D upon receipt of E and Produce E every minute.

The Communication between agents and the community server is also shown in the Figure.

Communication line 16 is a request of Data Product A from the community server.

Communication line 18 shows the community server forwarding the Data Product A from Agent 10 to Agent 6.

Communication line 20 is transmitting Data Product A to Agent 10 from Agent 6.

Communication line 22 is announcing Data Product E to community server.

Communication line 24 represents the community server forwarding the announcement of Data Product to Agent 14.

Communication line 26 requests Data Product E from Agent 10.

Communication line 28 transmits Data Product D to Agent 14.

Communication line 30 is announcing Data Product D to the community server.

Communication line 32 represents the community server forwarding the announcement of Data Product D to Agent 8.

Communication line 34 requests Data Product D from Agent 8.

Communication line 36 transmits Data Product D from Agent 10 to Agent 8.

Communication line 38 announces Data Product C to the community server.

Communication line 40 represents the community server forwarding the announcement of Data Product C to Agent 6 for Agent 8.

Communication line 42 requests Data Product C from Agent 6.

Communication line 44 transmits Data Product C from Agent 8 to Agent 6.

Communication line 46 announces Data Product B to the community server.

Figure 2:
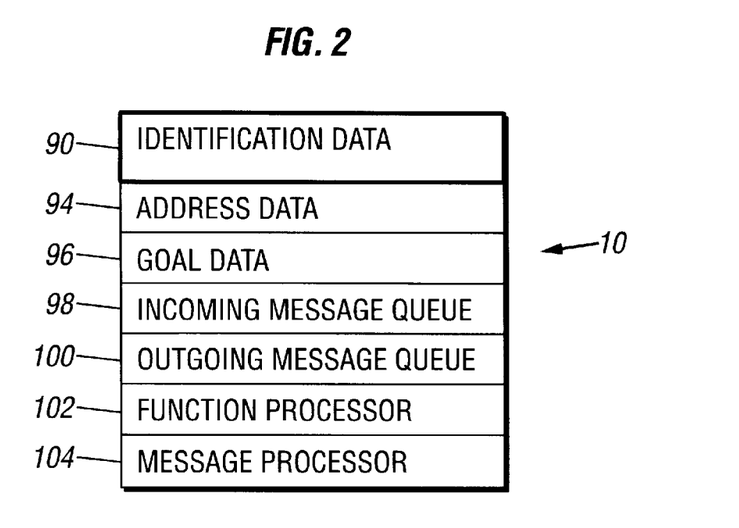
FIG. 2 shows a model of an agent instance.

Further, as shown in FIG. 2, an agent, such as Agent 10 will have an identification Data 90 and address data 94, a set of goals, 96, an incoming message queue 98, an outgoing message queue 100, a function processor 102, and a message processor 104.

The identification data 90 contains data used to identify the specific agent. The data in this field must be unique so as to distinguish the individual agent 10 from all other agents. In the preferred embodiment of the present invention, the structure of the identification data 90 is a character string containing the agent's name and another character string containing the access code. The datum contained within this field can be copied into the outgoing message queue 100 so that the datum may be transmitted to another agent or a user.

The address data 94 contains the unique socket for the agent. Sockets of course, are unique. The structure of address field 94 must be large enough to accommodate the IP address and TCP port number. In the preferred embodiment of the present invention, the structure of the address field is an array of four bytes each containing 8 bits (for the IP address) as well as a fifth element containing 16 bits (for the TCP port). The socket information can be copied over from the incoming message queue 98 so that the agent may retain the unique socket assigned by the operating system. In addition, the information contained in the address data 94 can be copied to the outgoing message queue 100 so that the data may be transmitted to another agent or a user.

The goal data 96 contains instructions for the agent or a set of goals These instructions can be copied over from the incoming message queue 98 so that other agents or a user may assign a goal for the agent 10. In addition, the information contained in the goal 96 can be copied to the outgoing message queue 100 so that the goal of the agent may be transmitted to another agent or a user. The information contained within the goal data 96 is used to direct the agent to perform some sub-task. For example, the goal may be to access a page on the World Wide Web and confirm its existence and gather a list of links contained within the page. The format of the goal can be an agreed-upon standard within an industry or it may be strictly proprietary. However, the format of the goal provide sufficient information to the function method 102 so that the agent 10 can accomplish the goal.

The incoming message queue 98 receives and stores messages sent to the agent 10 from a community server 4 or another agent such as agents 6 or 8. The incoming message queue 98 is further capable of sending a copy of a particular message to the message processor 104.

The outgoing message queue 100 receives messages and addresses from the message processor 104. The outgoing message queue 100 is capable of sending messages to a community server 4, to another agent, or to a user.

The function processor 102 enables the agent 10 to perform its intended function on the network. The function contained within function processor 102 can be any function or process that can be carried out by a software program. This enables agents to perform a wide variety of tasks. For example, the function processor 102 may enable the agent 10 to retrieve a designated web page from a web server and e-mail the contents of the web page to a user's mailbox. The function processor 102 is the product of the agent 10, in the sense that the The message processor 104 is used to interpret messages received in the incoming message queue 98 or to create messages to be placed in the outgoing message queue 100.

Agents are designed to run independently of one another. This enables agents to be executing simultaneously on distributed computers within the same network. In the case of the Internet, agents can be located anywhere in the world. Agents can be written in Java so that they are platform independent. Java-based agents are particularly useful for Internet applications where the type of system upon which the agent will operate is not known beforehand.

All of data transfers are handled via sockets. The agent is run (executed) on a PC or server that has a TCP connection to the Internet but can also run on any hardware that has Java Virtual Machine. A community server is created and kept running on a server that also has access a TCP connection to the Internet. The community server is always at an agreed upon port. Upon execution, a new agent first requests a port number from the operating system. Once obtained, the agent stores its port number and sends a signal to the community server announcing its own port number. The community server retains the port number of the agent along with whatever other information is provided by the agent. Basic requests can be made to the community server, which may respond with information or the port number of another agent. With the port number of the other agent, then point-to-point communication can commence, thus reducing network traffic and allowing for more privacy.

The software of the present invention can execute on any hardware platform with the following characteristics:

a. Java Virtual Machine (operating system)

b. 200 Megs of hard disk.

c. 8 megs of memory d. a network connection is preferred but is not required.

This invention involves apparatus for transferring electrical signals between at least two agents and a community server in an electronic community on a computer system comprising a storage device; a central processing unit capable of running multiple programs simultaneously; a network connection terminal capable of sending and receiving electrical signals from at least one non-system device to said terminal; and at least two agent instances.

Each agent instance has an ability to register with a community server using a socket address defining the location of the agent instance on the computer system. Each agent instance contains identification data used to recognize the agent instance, production profile data, and data product characterization data.

Further, each agent instance has data defining a set of goals. The set of goals is used to define the purpose of the agent instance. Each agent instance has an incoming message queue, capable of receiving messages on said computer system for the agent instance, a mess age processor capable of interpreting messages received by the incoming message queue and generating task signals in response to the incoming messages from other agents, and a function processor capable of producing data product on the computer system in response to a task signal from the message processor and transmitting the data product to another agent. Each agent also has an outgoing message queue for processing data product announcements and data product requests to the community server and other agents.

The invention includes a community server instance comprising an incoming message queue capable of receiving information from agents, and including but not limited to the production profiles of each agent, data product characterizations from each agent, a message processor capable of interpreting messages received by an incoming message queue. The community server instance can generate task signals in response to incoming messages from agents, and request information from agents, including but not limited to production profiles of each agent and data product characterizations of each agent. The community server includes a processor for receiving and compiling production profiles of agents into a production map, a processor receiving, storing, comparing, and updating data product characterizations received from agents, and a processor with an outgoing message queue for receiving and responding to data product announcements and data product requests from agents.

The community server further has storage capacity for data product characterization and a processor for resolving conflicts between data product characterizations.

This invention, also known as "Agent Nation" is a 100% pure Java application. The invention can run on a machine as slow as a 486 PC and can operate on faster machines, such as the Pentium or better. This invention can run on Silicon Graphics, Sun Operating Systems, Unix based systems or any system which has a Java Virtual machine installed on it. The invention can run on a stand alone machine or a network of computers, any computer "system."

What is claimed is:

1. A method for transferring electrical signals between at least two agents and a community server in an electronic community on a computer system comprising:

at least one agent capable of communicating with at least one other agent and a community server;
   each agent having a production profile and a set of goals and capable of performing the following steps:
   a. registering with the community server by the steps of:
      1. transmitting a production profile to the community server,
      2. transmitting a data production characterization to the community server,
   b. executing on the set of goals of the agent for one or more of the following tasks:
      1. making announcements to the community server of data products produced by said agent,
      2. making requests to the community server for data products needed by said agent,
      3. receiving requests for data products from at least one other agent,
      4. transmitting data products based on requests for data products to at least one other agent, and
   said community server capable of the following steps:
   a. receiving production profiles from each agent,
   b. creating a production map comprising the production profiles of each agent,
   c. receiving data product characterizations from each agent,
   d. storing data product characterizations,
   e. processing announcements regarding data products from at least one agent by the following steps:
      1. receiving announcements for data products from an agent,
      2. identifying agents in the production map which have production profiles containing a consumption specification for the data products in the announcement,
      3. transmitting announcements for data products to identified agents having the production profiles containing the consumption specification for the data products in the announcements, and
   f. processing requests for data products from at least one agent by the following steps:
      1. receiving requests for data products from an agent,
      2. identifying agents in the production map which have production profiles containing a production specification for the data products in the requests,
      3. transmitting requests for data products to identified agents having the production profiles containing the production specification for the data products in the requests.

2. The method as in claim 1, wherein the community server is additionally capable of the following step:

using the stored data product characterizations to resolve conflicts between data product characterizations used by different agents.

3. The method as in claim 1, wherein the community server is further capable of requesting production profiles from each agent.

4. The method as in claim 1, wherein the community server is further capable of requesting data product characterizations from each agent.

5. The method as in claim 1, wherein the community server is capable of updating the stored data product characterizations.

6. Apparatus for transferring electrical signals between at least two agents and a community server in an electronic community on a computer system comprising:

(i) a storage device;
   (ii) a central processing unit capable of running multiple programs simultaneously;
   (iii) a network connection terminal capable of sending and receiving electrical signals from at least one non-system device to said terminal;
   (iv) at least two agent instances, each agent comprising:
   a. an ability to register with a community server using:
      1. a socket address defining the location of the agent instance on the computer system,
      2. identification data used to recognize the agent instance,
      3. production profile data, and
      4. data product characterization data,
   b. data defining a set of goals, said set of goals being used to define the purpose of the agent instance,
   c. an incoming message queue, capable of receiving messages on said computer system for said agent instance,
   d. a message processor capable of interpreting messages received by said incoming message queue and generating task signals in response to said incoming messages from other agents;
   e. a function processor capable of producing data product on said computer system in response to a task signal from said message processor and transmitting said data product to another agent,
   f. an outgoing message queue for processing data product announcements and data product requests to the community server and other agents;
   (v) a community server instance comprising:
   a. an incoming message queue capable of receiving information from agents, including but not limited to production profiles of each agent, and data product characterizations from each agent, b. a message processor capable of interpreting messages received by said incoming message queue and generating task signals in response to said incoming messages from agents, c. an ability to request information from agents, including but not limited to production profiles of each agent and data product characterizations of each agent, d. a processor for receiving and compiling production profiles of agents into a production map, e. a processor receiving, storing, comparing, and updating data product characterizations received from agents, and f. a processor with outgoing message queue for receiving and responding to data product announcements and data product requests from agents.

7. The apparatus of claim 6, wherein the community server further has storage apparatus for data product characterization and a processor for resolving conflicts between data product characterizations.

8. The apparatus of claim 7, wherein each agent instance further comprises a processor for creating and delegating tasks to a subordinate agent by the following steps:

a. creating a subordinate agent to handle a portion of the set of goals of said agent creating the subordinate agent, wherein the subordinate agent has an identical production profile to the agent creating said subordinate agent and a portion of the set of goals of the agent creating said subordinate agent; and b. initiating the execution of the subordinate agent's set of goals.

9. The apparatus of claim 7, further comprising a database interconnecting said storage device, said central processing unit and said terminals.

* * * * *